United States Patent
Tokumoto

(10) Patent No.: US 11,262,961 B2
(45) Date of Patent: Mar. 1, 2022

(54) PRINTING SYSTEM AND CONTROL METHOD FOR PERFORMING USER AUTHENTICATION

(71) Applicant: CANON KABUSHIKI KAISHA, Tokyo (JP)

(72) Inventor: Hirokazu Tokumoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/907,989

(22) Filed: Jun. 22, 2020

(65) Prior Publication Data

US 2020/0409642 A1   Dec. 31, 2020

(30) Foreign Application Priority Data

Jun. 27, 2019   (JP) .............................. JP2019-120039

(51) Int. Cl.
   *G06F 3/12* (2006.01)
(52) U.S. Cl.
   CPC .......... *G06F 3/1267* (2013.01); *G06F 3/1238* (2013.01); *G06F 3/1269* (2013.01); *G06F 3/1274* (2013.01)
(58) Field of Classification Search
   None
   See application file for complete search history.

(56) References Cited

U.S. PATENT DOCUMENTS

| | | | |
|---|---|---|---|
| 2010/0253964 A1* | 10/2010 | Isshiki ................. | G06F 3/1285 358/1.14 |
| 2014/0218764 A1* | 8/2014 | Murata .................... | H04N 1/00 358/1.15 |
| 2018/0039772 A1* | 2/2018 | Tokumoto ............ | H04N 1/4426 |

FOREIGN PATENT DOCUMENTS

JP   2010-170234 A   8/2010

* cited by examiner

*Primary Examiner* — Thomas D Lee
(74) *Attorney, Agent, or Firm* — Canon U.S.A., Inc. IP Division

(57) ABSTRACT

First and second printing apparatus are in an intranet and a bibliography server connected to the Internet. The bibliography server being configured to manage bibliographic information of print data. The first printing apparatus acquire a list of print data from the bibliography server, when an instruction to print out print data included in the list is received from a user with an operating unit of the first printing apparatus, sends identification information for identifying the print data to the second printing apparatus and when a print request is received, prints out print data included in the received print request. The second printing apparatus sends bibliographic information of print data received from an external apparatus to the bibliography server; and sends a print request containing the print data identified by the identification information to the first printing apparatus.

5 Claims, 15 Drawing Sheets

FIG. 7

| USER NAME | JOB ID | DATE AND TIME OF RECEIPT | STORAGE LOCATION | | JOB NAME | PRINT SETTING | | | | | |
|---|---|---|---|---|---|---|---|---|---|---|---|
| | | | IP ADDRESS | PATH | | COLOR | SIZE | NUMBER OF COPIES | TWO-SIDED | STAPLE | PUNCH |
| SATO | 1 | 2019.05.14 15:05 | 192.168.0.1 | /printdata/1/data.prn | index.html | BW | A4 | 3 | ONE-SIDED | NO | TWO HOLES |
| | 2 | 2019.05.14 17:21 | 192.168.0.2 | /printdata/2/data.prn | Meeting.docx | CL | A3 | 1 | TWO-SIDED | UPPER LEFT SINGLE | NO |

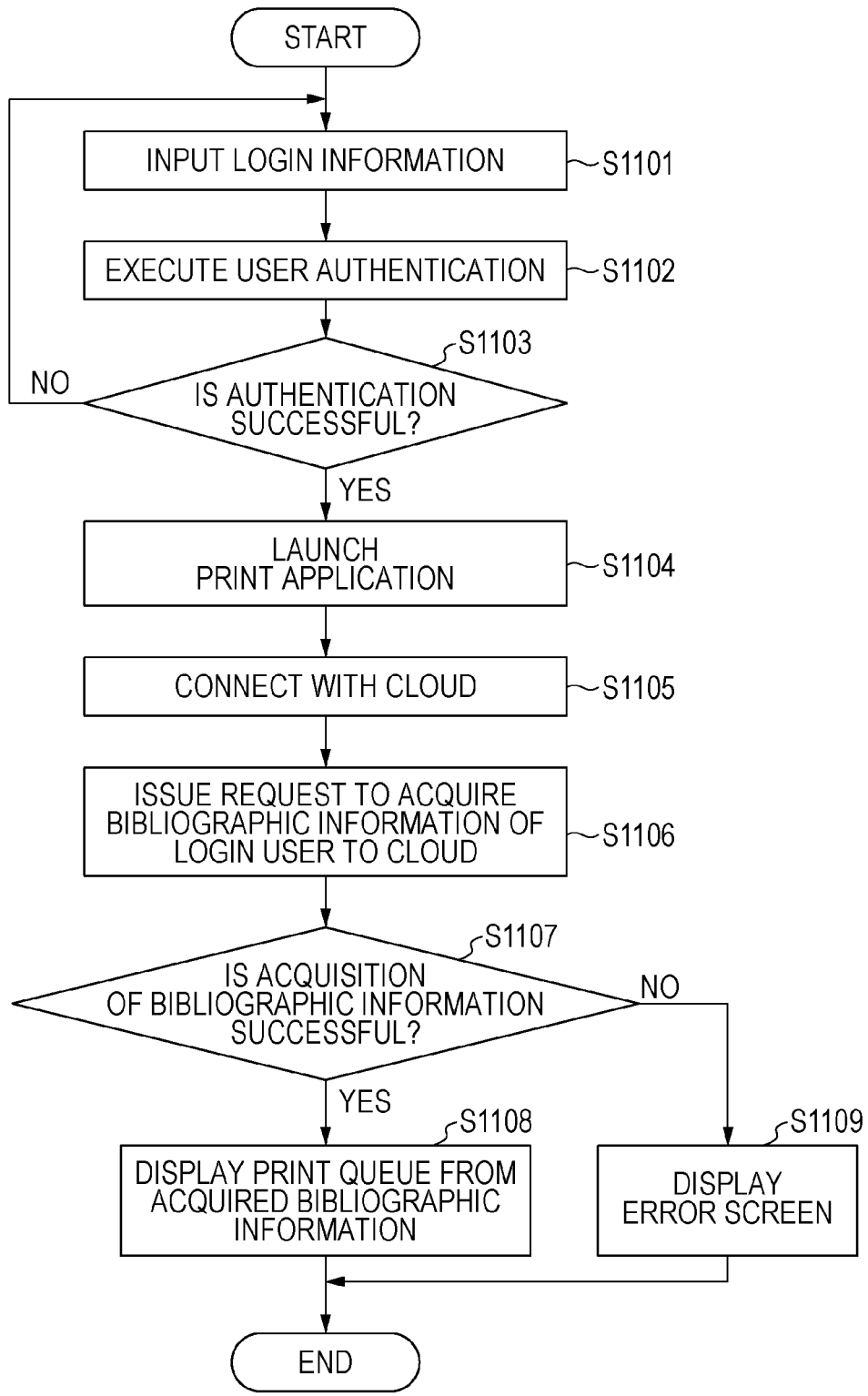

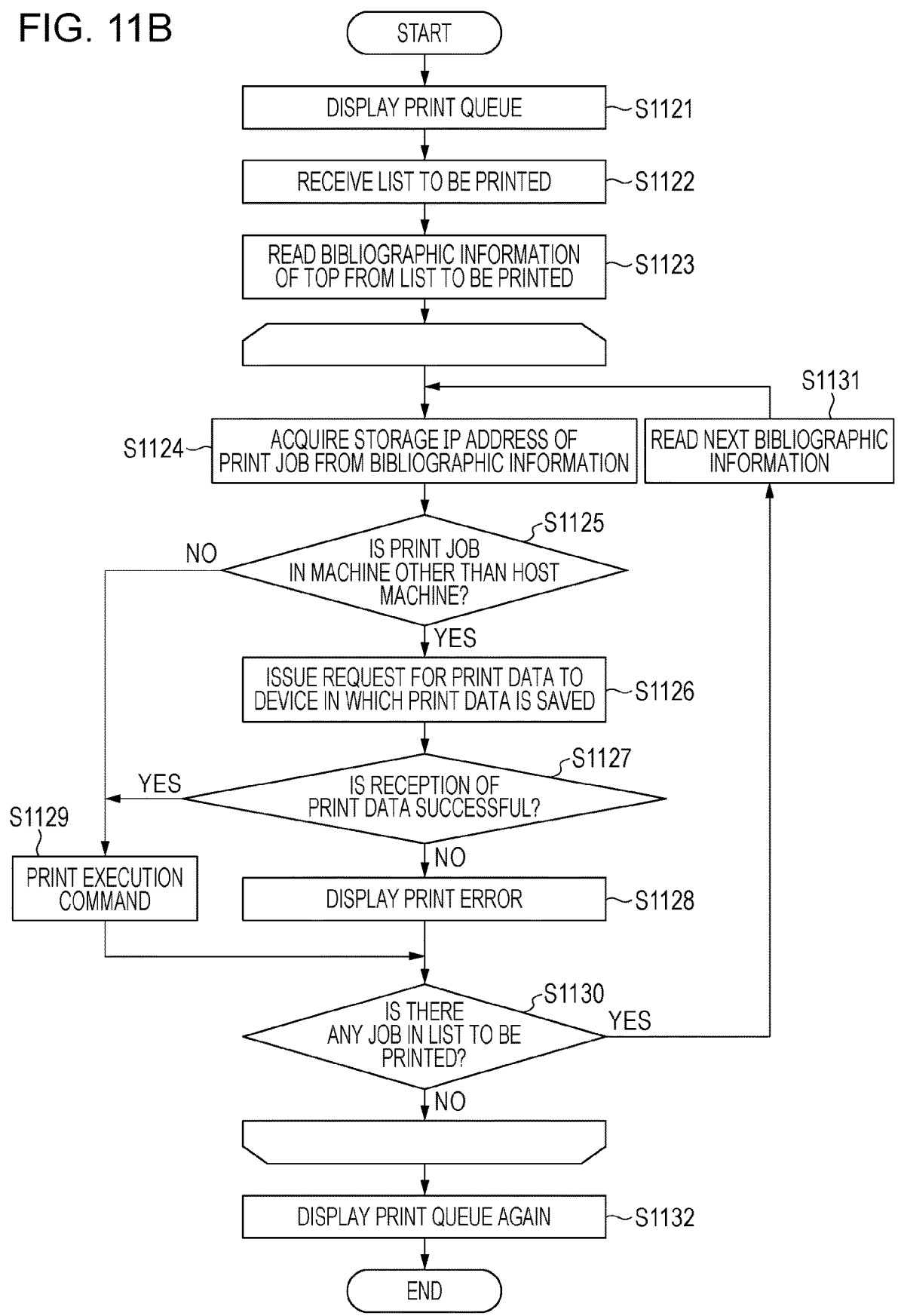

PRINTING SYSTEM AND CONTROL METHOD FOR PERFORMING USER AUTHENTICATION

BACKGROUND

Field of the Disclosure

The present disclosure relates to a printing system and a control method.

Description of the Related Art

When existing multifunction peripherals receive print jobs from terminal devices, such as PCs, the multifunction peripherals print in accordance with the print jobs immediately. In this case, information leakage may occur as a result of third persons seeing printed matter forgotten to pick up or printed matter left behind. In recent years, in order to keep confidentiality, reserve printing has been proposed. In reserve printing, print jobs are reserved once in nonvolatile storage areas of multifunction peripherals without immediately printing in accordance with the print jobs upon receiving the print jobs, and then printing is performed when users provide print instructions on operating units of the multifunction peripherals.

In addition, in recent years, remote printing is also proposed. In remote printing, not only multifunction peripherals having received print jobs but also other multifunction peripherals are able to print by acquiring the print jobs reserved in the multifunction peripherals having received the print jobs.

Furthermore, a server apparatus stores image output data received from a client apparatus 1 via a LAN in an output data storage unit and sends the image output data via the same LAN to a printer that performs printing (Japanese Patent Laid-Open No. 2010-170234). An output data management unit in the server apparatus generates a list of pieces of image output data associated with user authentication information from among pieces of image output data in the output data storage unit.

In Japanese Patent Laid-Open No. 2010-170234 described above, the server apparatus in the LAN manages print data to be printed and its bibliographic information. Although not estimated in Japanese Patent Laid-Open No. 2010-170234, it is conceivable as a configuration for remote printing that a cloud server on the Internet manages print data and bibliographic information. However, when a cloud server manages print data, it may take time to acquire print data as compared to when a server apparatus in a normal intranet manages print data. Therefore, it may take time from when a user provides a print instruction on an operating panel of a printing apparatus to when print data is actually printed out.

SUMMARY

Embodiments of the present disclosure provide a printing system comprising: a first printing apparatus and a second printing apparatus in an intranet; and a bibliography server connected to the Internet, the bibliography server being configured to manage bibliographic information of print data, the first printing apparatus including: one or more first memories; and one or more first processors that execute a set of first instructions to: acquire a list of print data from the bibliography server; when an instruction to print out print data included in the list is received from a user with an operating unit of the first printing apparatus, send identification information for identifying the print data to the second printing apparatus; and when a print request is received, print out print data included in the received print request, and the second printing apparatus including: one or more second memories; and one or more second processors that execute a set of second instructions to: send bibliographic information of print data received from an external apparatus to the bibliography server; and send a print request containing the print data identified by the identification information to the first printing apparatus.

Further features of the present disclosure will become apparent from the following description of exemplary embodiments with reference to the attached drawings.

BRIEF DESCRIPTION OF THE DRAWINGS

FIG. 7 is a view that shows the entity of bibliographic information that is stored in the cloud server.

FIG. 11A is a flowchart that shows an example of a procedure in which the multifunction peripheral (output machine) displays a print queue.

FIG. 11B is a flowchart that shows an example of a procedure in which the multifunction peripheral (output machine) prints out print data.

DESCRIPTION OF THE EMBODIMENTS

Hereinafter, an embodiment of the present disclosure will be described with reference to the accompanying drawings.

Network Configuration of Remote Printing System

Figure 1:
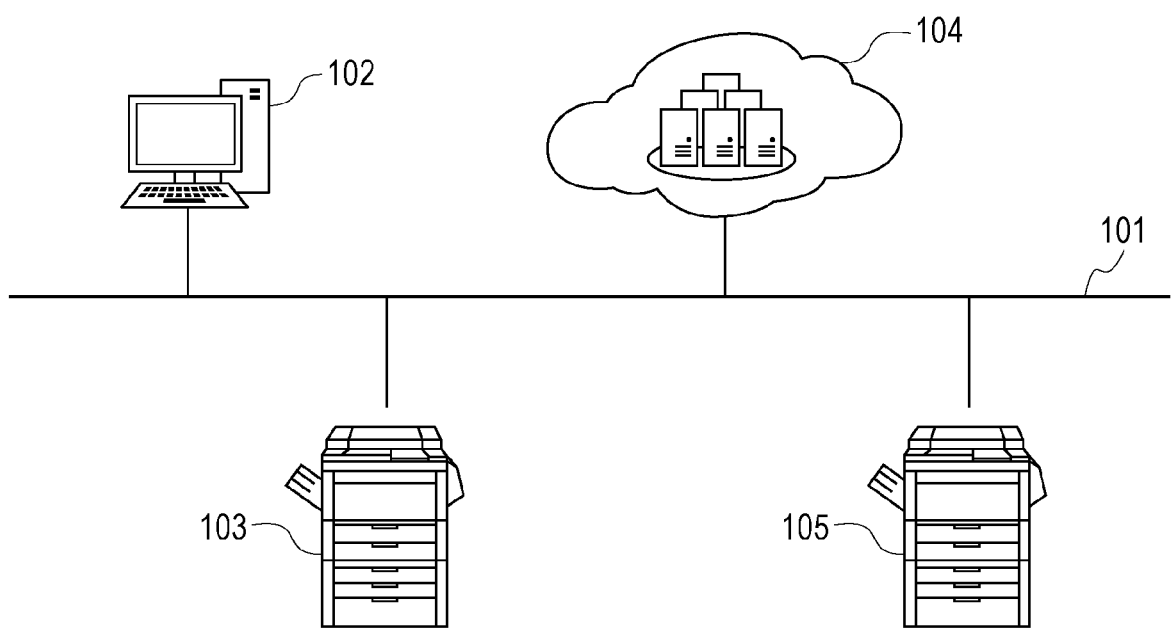
FIG. 1 is a view that shows the network configuration of a remote printing system.

FIG. 1 is a view that shows a network configuration to which multifunction peripherals that are image forming apparatuses and a cloud server that is an information processing apparatus according to the embodiment of the present disclosure are applicable. In FIG. 1, reference numeral 101 represents, for example, a network that supports TCP/IP. A personal computer 102 serving as an information processing apparatus, a cloud server 104, and multifunction peripherals 103 and 105 are connected to the network 101. In the present embodiment, description will be made on the assumption that the personal computer 102 and the multifunction peripherals 103 and 105 are in an intranet, and the cloud server is on the Internet.

The multifunction peripheral 103 is an input machine that, upon receiving a print job from the personal computer 102, stores the print job when a remote printing function is being used. The multifunction peripheral 103 creates bibliographic information from the received print job and sends the bibliographic information to the cloud server 104.

The cloud server 104 collectively manages pieces of bibliographic information of print jobs stored in all the multifunction peripherals registered on the same network 101. It is also conceivable that the multifunction peripheral 103 or the multifunction peripheral 105 manages bibliographic information as an information processing apparatus that manages bibliographic information; however, there are the following three advantages when a cloud server manages bibliographic information.

A response performance is maintained when processing load increases.

An extension of an upper limit of manageable bibliographic information is easy.

Down time of a bibliography management server is reduced.

When a multifunction peripheral manages bibliographic information, since the multifunction peripheral itself has a copy function and/or a scan function, a response performance of management of bibliographic information may decrease when the multifunction peripheral operates at the same time with the function to manage bibliographic information or when requests for a bibliographic information management function concentrate on a server.

In addition, when a multifunction peripheral is used as a bibliography management server, resources of a permanent storage capacity, such as a hard disk drive, are also limited, so extensibility of an upper limit of manageable bibliographic information is poor.

Furthermore, when a multifunction peripheral is used as a bibliography management server, down time of the bibliography management server can occur because the multifunction peripheral may be turned off.

These problems are eliminated when bibliographic information is managed by a cloud server.

The multifunction peripheral 105 receives authentication information from a user and authenticates the user. The multifunction peripheral 105 is an output machine that, after user authentication, acquires bibliographic information from the cloud server 104 based on the authentication information, receives a print job from the input machine 103 based on the acquired bibliographic information, and performs printing.

The above-described configuration is a general configuration for the sake of easy illustration. A plurality of the personal computers 102, a plurality of the multifunction peripherals 103, or a plurality of the multifunction peripherals 105 may be provided.

Each of the multifunction peripherals 103 and 105 operates as not only an input machine but also an output machine. In other words, each of the multifunction peripherals registered in this system operates as not only an input machine but also an output machine. Each of the multifunction peripherals 103 and 105 does not need to have a scan function or a copy function and may be a printer 103 or a printer 105 having only a print function.

Schematic Configuration of Each of Multifunction Peripherals 103 and 105

Figure 2:
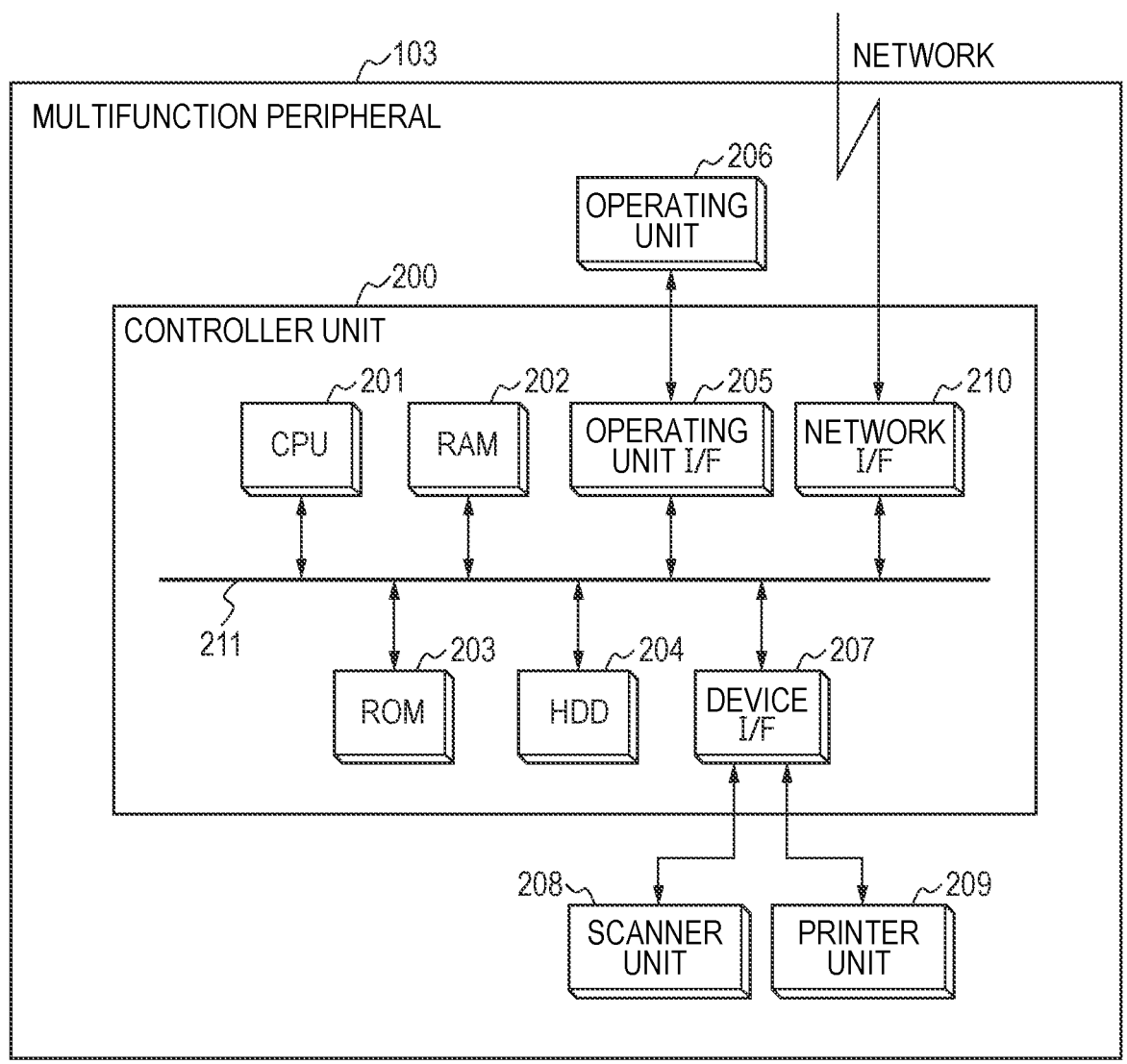
FIG. 2 is a diagram that shows the schematic configuration of a multifunction peripheral.

FIG. 2 is a diagram that shows the schematic configuration of each of the multifunction peripherals 103 and 105 according to the embodiment of the present disclosure. In FIG. 2, the multifunction peripheral 103 will be described for the sake of simple illustration.

In FIG. 2, the multifunction peripheral 103 includes a controller unit 200, an operating unit 206, a scanner unit 208, and a printer unit 209.

The controller unit 200 is an apparatus that controls the multifunction peripheral or the printer. The controller unit 200 includes a CPU 201, a RAM 202, a ROM 203, an HDD 204, an operating unit I/F 205, a device I/F 207, and a network I/F 210, which are connected by a system bus 211.

The CPU 201 generally controls the devices connected to the system bus 211 and controls the overall image forming apparatus 103. Programs such as an operating system, system software, and application software, and data are stored in the RAM 202. A boot program of the system, a system program, and an application program are stored in the ROM 203. Furthermore, information, such as fonts, that is used in the image forming apparatus 103 may be further stored in the ROM 203. The HDD 204 is a hard disk drive. An operating system, system software, application software, image data, setting data, print data, and the like, are stored in the HDD 204. Programs stored in the RAM 202 are executed by the CPU 201 to process image data or data other than images, stored in the RAM 202, the ROM 203, or the HDD 204. A compact multifunction peripheral does not include the HDD 204 and stores system software, application software, and the like, in the ROM 203. Alternatively, instead of the HDD 204, a storage other than a hard disk drive, like a flash memory, such as a solid state disk (SSD), may be used.

The operating unit I/F 205 is an interface unit with the operating unit 206 having a touch panel. The operating unit I/F 205 outputs image data to be displayed on the operating unit 206 to the operating unit 206. The operating unit I/F 205 sends information input by a user from the operating unit 206 to the CPU 201.

The device I/F 207 connects the scanner unit 208 and the printer unit 209 that are image input/output devices to the controller unit 200 and inputs or outputs image data. Image data input from the scanner unit 208 via the device I/F 207 is stored in the RAM 202 or the HDD 204. Stored image data is, where necessary, subjected to image processing, or the like, with the application program stored in the RAM 202. Image data is output to the printer unit 209 via the device I/F 207. The network I/F 210 connects with a network and inputs or outputs image data in an external apparatus on the network or information for controlling the multifunction peripheral.

A configuration not shown in FIG. 2 is also applicable as long as the advantageous effects of the present disclosure are obtained, and a configuration is not limited to the configuration of FIG. 2. For example, in the case of a multifunction peripheral having a facsimile (fax) function, the controller unit 200 may include an I/F (not shown in FIG. 2) intended for a modem and may be able to send a fax by connecting with a public line with the modem. Alternatively, in order to make it possible to read out data stored in, for example, a flash memory card, or the like, and print out the data, the controller unit 200 may include a USB I/F (not shown).

Software Configuration of Each of Multifunction Peripherals 103 and 105

Figure 3:
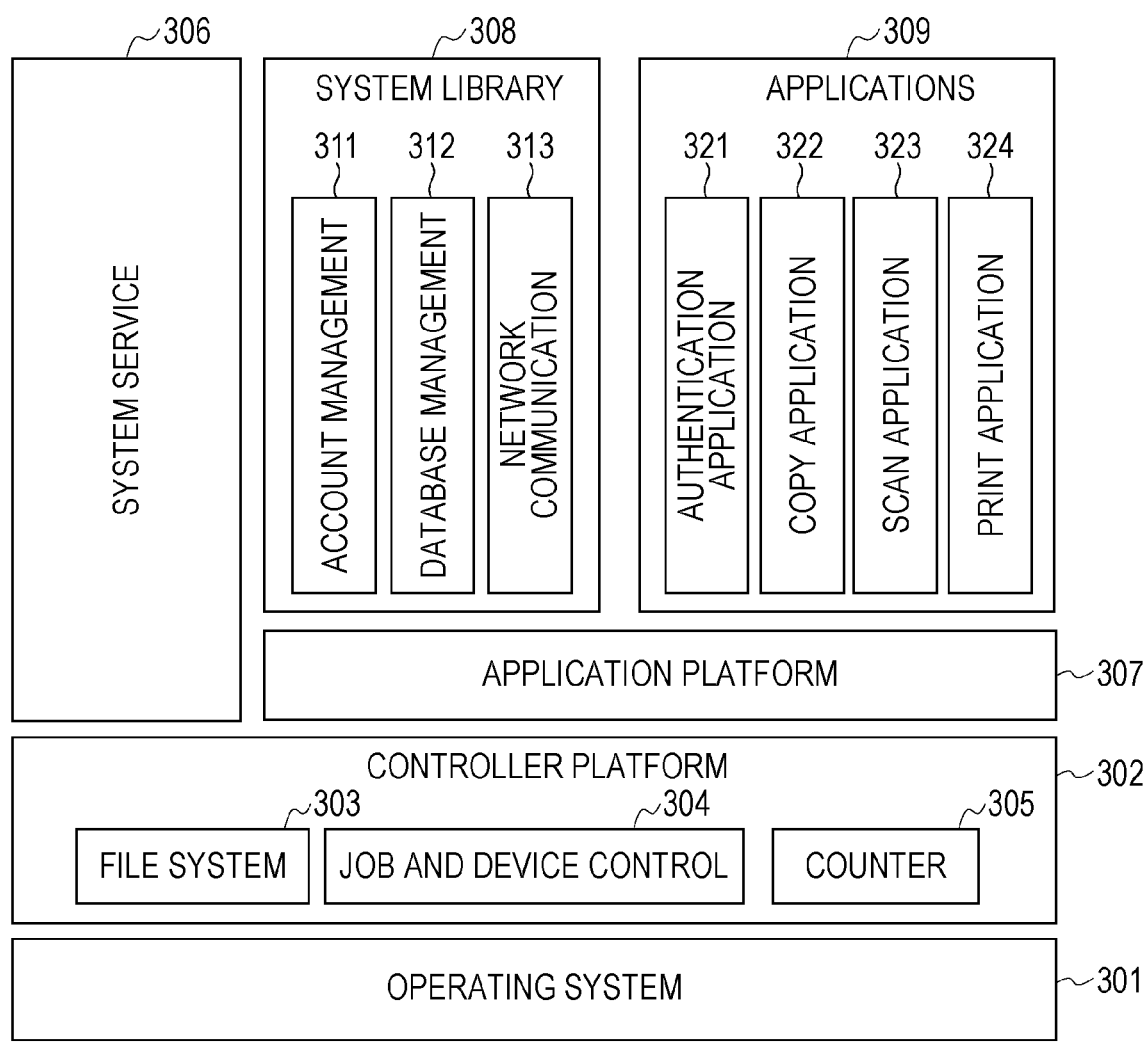
FIG. 3 is a diagram that shows the software configuration of the multifunction peripheral.

FIG. 3 is a diagram that shows the software configuration of each of the multifunction peripherals 103 and 105 according to the embodiment of the present disclosure, which is implemented in the controller unit 200. Software that is incorporated in the multifunction peripheral or printer and processed by the controller unit 200 is implemented as so-called firmware and is executed by the CPU 201.

An operating system 301 provides services and frameworks of various resources management optimized to control an embedded system for software that runs on the operating system 301. The services and frameworks for resources management, which the operating system 301 provides, include multi-task management for substantially operating a plurality of processes in parallel by managing a plurality of running contexts to be processed by the CPU 201, and inter-task communication that realizes synchronization between tasks and data exchange. Furthermore, the operating system 301 provides memory management, interrupt management, various device drivers, a protocol stack that implements processes of various protocols for a local interface, a network, communication, and the like, and other functions.

A controller platform 302 is made up of a file system 303, job and device control 304, and a counter 305. The file system 303 is a mechanism for storing data constructed on a storage such as the HDD 204 and the RAM 202. The file system 303 is used to spool jobs that the controller unit 200 handles or save various data. The job and device control 304 controls the hardware of the multifunction peripheral or printer and mainly controls jobs that use basic functions (print, scan, communication, image conversion, and the like) that the hardware provides. The counter 305 manages the expiration date of each application and counter values based on usages of print and scan.

A system service 306 is a module for monitoring the operational status of the multifunction peripheral or printer or downloading software or license from a software distribution server via the network.

An application platform 307 is middleware for enabling the mechanisms of the operating system 301 and controller platform 302 to be used from a system library 308 (described later) or applications 309 (described later).

The system library 308 is a software module that provides functions of services available from the applications 309. The system library 308 is made up of account management 311, database management 312, and network communication 313.

The applications 309 are software modules that are able to display a menu on the operating unit 206 and receive input from a user and that provide the user with various functions that are realized by the multifunction peripheral or printer.

An authentication application 321 is one of the applications 309. The authentication application 321 manages users that are allowed to use the multifunction peripheral 103 or the multifunction peripheral 105 by using the account management 311 that is in the system library 308. The account management 311 performs user authentication by communicating with an authentication application 410 of the cloud server 104 (described later) by using the network communication 313. The account management 311 authenticates a user by communicating with the authentication application 410 for verifying a user name and a password input via the operating unit 206.

A copy application 322 is one of the applications 309. The copy application 322 provides a paper document copy function by accessing the job and device control 304 via the application platform 307.

A scan application 323 is one of the applications 309. The scan application 323 provides a function to scan a paper document and create electronic data by accessing the job and device control 304 via the application platform 307.

A print application 324 is one of the applications 309. When the remote printing function is enabled, the print application 324 reserves a received print job, creates bibliographic information from the print job, and sends a registration request to the cloud server 104.

The print application 324 communicates with the cloud server 104 by using the network communication 313 and displays a print queue or changes a setting for a print job or deletes a print job from the acquired bibliographic information.

The print application 324 connects with another multifunction peripheral 103 or another multifunction peripheral 105 by using the network communication 313 and provides the remote printing function to hold an acquired print job in the HDD 204 and run the print job.

The print application 324 provides a function to execute output in accordance with a print job held in the HDD 204 by accessing the job and device control 304 via the application platform 307.

Software Configuration of Cloud Server 104

Figure 4:
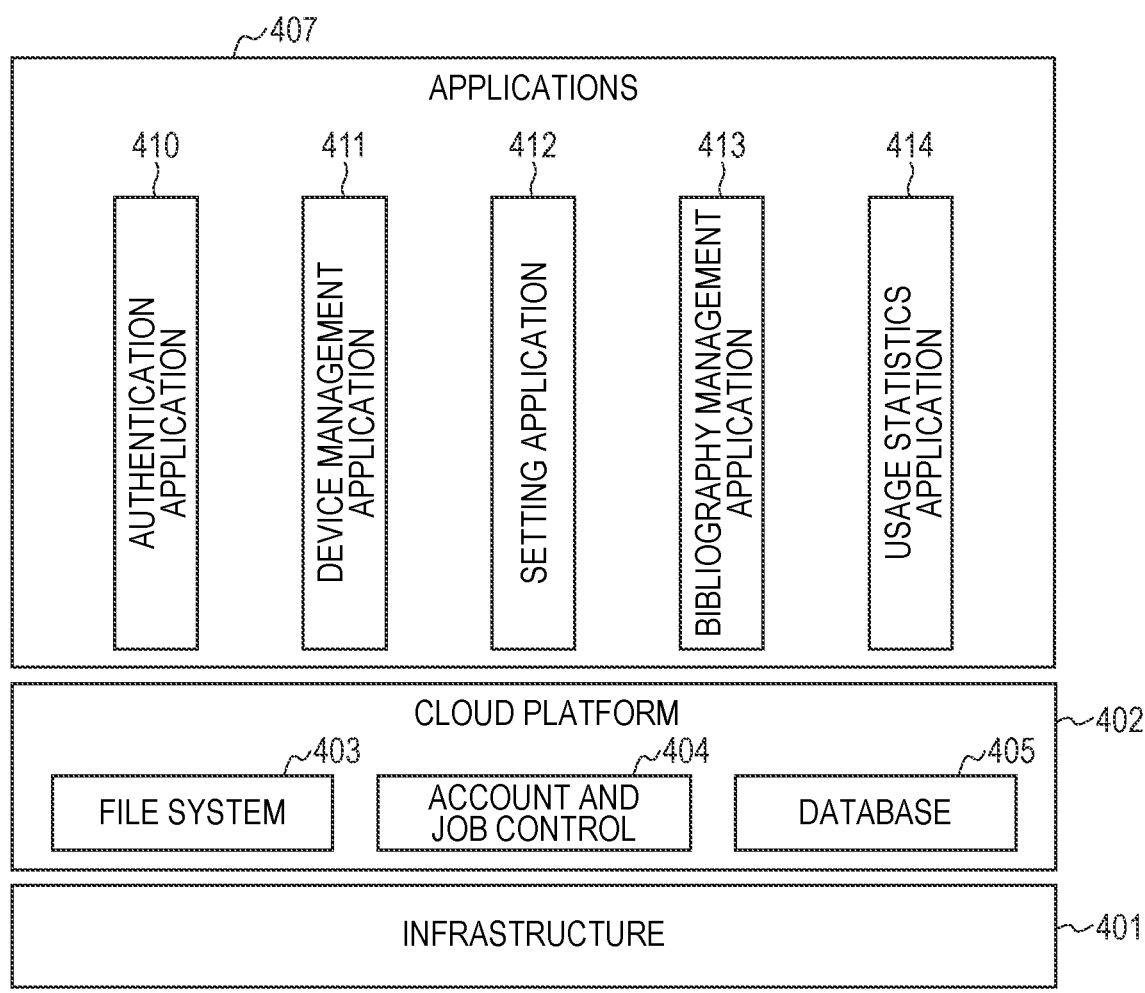
FIG. 4 is a diagram that shows the software configuration of a cloud server.

FIG. 4 is a diagram that shows the software configuration of the cloud server 104 according to the embodiment of the present disclosure, which is implemented in the cloud server 104.

An infrastructure 401 is a base for a cloud server to provide services and is made up of a server, a virtual machine, a storage, a network, and an operating system.

A cloud platform 402 is a framework that provides common basic functions to applications 407 by using the infrastructure 401 and is made up of a file system 403, account and job control 404, and a database 405.

The applications 407 are able to communicate with a web browser that operates on the information processing apparatus 102 and display a menu on a web browser page on the information processing apparatus 102 or receive input from a user. The applications 407 are software modules that manage user accounts that are allowed to use the multifunction peripherals or printers, visualize usage statistics of the multifunction peripherals or printers, and provide users with various functions that use the multifunction peripherals or printers.

An authentication application 410 is one of the applications 407. The authentication application 410 manages users that are allowed to use the multifunction peripherals 103 and 105 by using the account and job control 404 in the cloud platform 402. The authentication application 410 receives user information on which an authentication request is sent from the authentication application 321 of any one of the multifunction peripherals 103 and 105 via the network and verifies a user name and a password. The authentication application 410 may use an external authentication server, such as Active Directory and LDAP, for user authentication without using the account and job control 404 in the cloud platform 402.

A device management application 411 is one of the applications 407. The device management application 411 performs device management, such as registration, editing, and deletion, of the multifunction peripherals 103 and 105 that are targets to be connected.

A setting application 412 is one of the applications 407. The setting application 412 sets functions to be provided to a user on the cloud server 104.

A bibliography management application 413 is one of the applications 407. The bibliography management application 413 manages bibliographic information that is printable by the multifunction peripherals 103 and 105 registered in the device management application 411 for each of users registered in the authentication application 410. Bibliographic information is management information of a print job input to a multifunction peripheral, such as a job ID of a print job, a date and time of receipt, an IP address and directory path of a multifunction peripheral in which a print job is stored, a job name, and a print setting.

A usage statistics application 414 is one of the applications 407. The usage statistics application 414 displays statistics information of usages of functions such as print and scan. A method of displaying statistics information is to display statistics information on the web browser page of the information processing apparatus 102 for each of the multifunction peripherals 103 and 105 registered in the device management application 411 or for each of users registered in the authentication application 410.

Top Menu Screen of Multifunction Peripheral

Figure 5A:
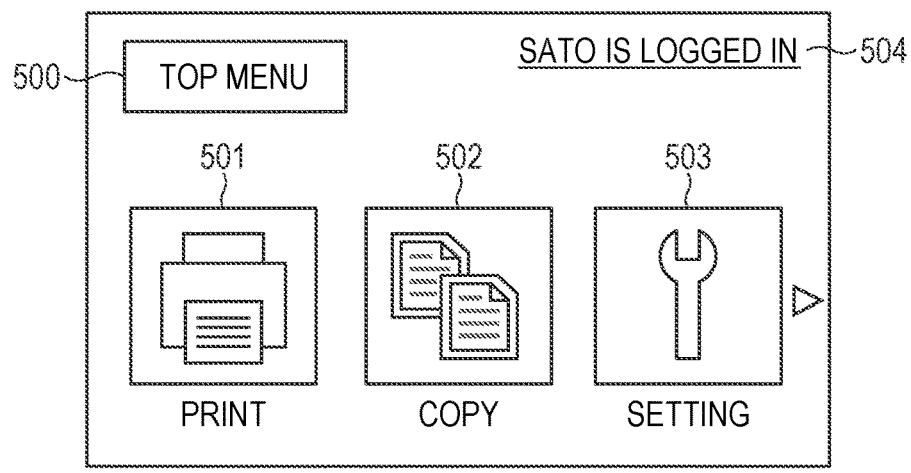
FIG. 5A to FIG. 5C are examples of screens that a print application of the multifunction peripheral displays on an operating unit.

FIG. 5A is an example of a top menu screen in the multifunction peripheral 105 that is an output machine according to the embodiment. This screen is displayed on the operating unit 206 of the multifunction peripheral 105.

When a user logs into the multifunction peripheral 105 with an IC card, or the like, a top menu 500 is displayed after the login, and the user is able to select an application to be used in the multifunction peripheral 105 from the top menu 500. Since the user is logged in the multifunction peripheral 105, a login user name 504 is displayed on the screen. An example of the screen on which the user name "Sato" is displayed during the login is shown.

The icons of the applications 309 installed in the multifunction peripheral 105 are displayed on the top menu 500. A print icon 501 is the icon of the print application 324. When the print icon 501 is depressed, the print application 324 is launched.

A copy icon 502 is the icon of the copy application 322. When the copy icon 502 is depressed, the copy application 322 is launched.

A setting icon 503 is the icon of an application that is one of the applications 309 to set up the multifunction peripheral 105.

Description of Print Queue Display Screen

Figure 5B:
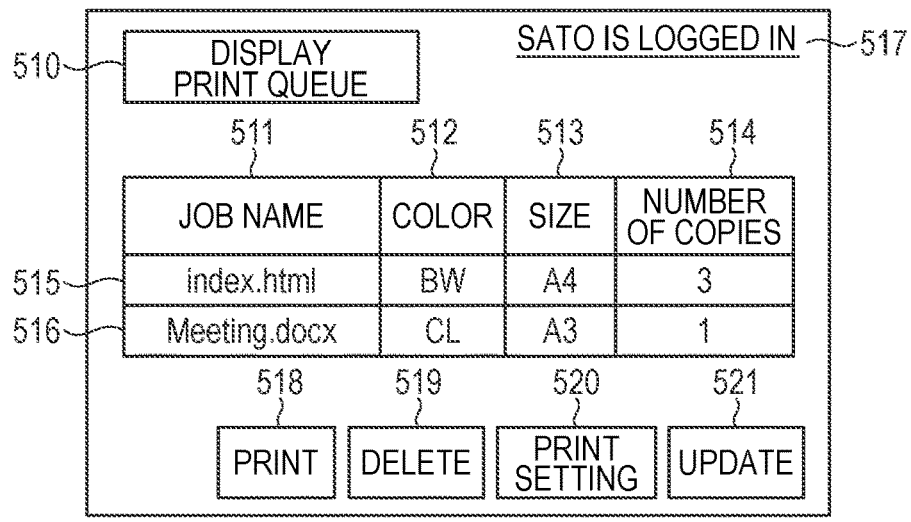

FIG. 5B is an example of a print queue display screen in the multifunction peripheral 105 that is an output machine according to the embodiment. This screen is displayed on the operating unit 206 by the print application 324 that is executed by the CPU 201 of the multifunction peripheral 105. On the print queue display screen, a list of print jobs that an authenticated user holds is displayed.

FIG. 5B is the print queue display screen 510 of the print application 324, which is displayed by depressing the print icon 501. An example of the screen on which the user name "Sato" is displayed during the login is shown. For each print job, a job name 511, a color/monochrome setting 512, a paper size 513, and the number of copies 514 are shown. Two print jobs 515, 516 are operational on this screen. The print application 324 acquires the bibliographic information of "Sato" that is the login user from the cloud server 104 that manages bibliographic information and displays the bibliographic information on the print queue display screen 510. For these print jobs, reference numeral 518 represents a print button, reference numeral 519 represents a delete button, reference numeral 520 represents a print setting button, the user selects a desired print job from among the print jobs displayed and depresses any one of these buttons. Thus, the user makes an operation on the intended print job. Reference numeral 518 indicates the login user. Reference numeral 521 represents an update button. When the update button is depressed, the print application 324 of the multifunction peripheral 105 acquires the bibliographic information of "Sato" that is the login user from the cloud server 104 again and updates a list of print jobs based on the acquired bibliographic information.

Description of Setting Change Screen

Figure 5C:
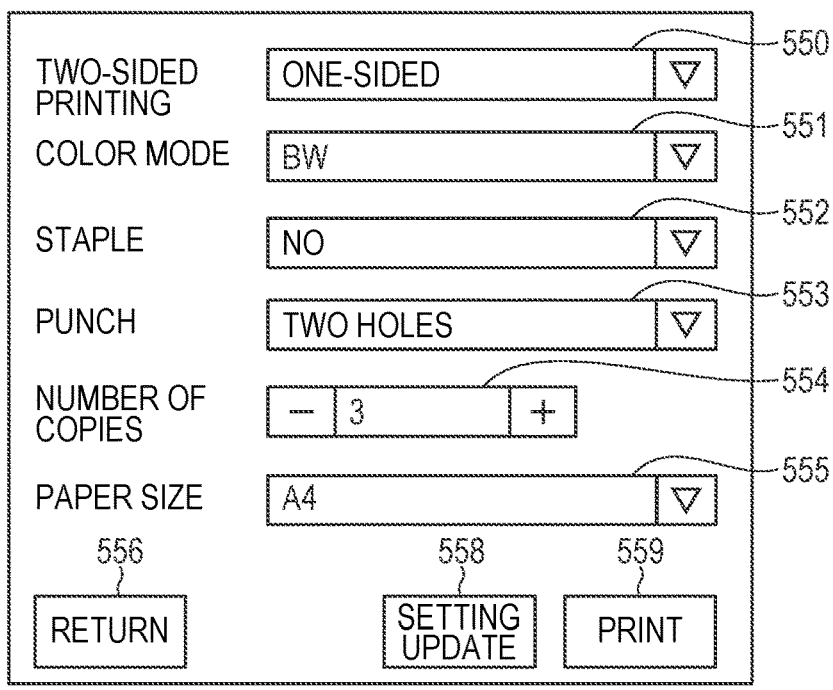

FIG. 5C is a print setting screen to be displayed when the print setting button 520 is depressed. For a print job selected on the print queue display screen 510, an operation to change a print setting, update the print setting, and print in accordance with the print job is possible. Currently set values are displayed for a two-sided printing setting 550, a color mode setting 551, a staple setting 552, a punch setting 553, a number of copies setting 554, and a paper size setting 555. The user is able to select a setting of print setting that the user desires to change from among these settings and change the set values. Reference numeral 556 represents a return button. When a print setting is changed and the return button is depressed, the changed print setting is cancelled. Reference numeral 558 represents a setting update button. When the user changes set values and then depresses this button, the print application 324 updates bibliographic information with the changed print setting and issues a request to update the bibliographic information to the cloud server 104. Reference numeral 559 represents a print button. When the user changes set values and then depresses this button, the print application 324 runs an intended print job in accordance with the changed print setting. After that, the print application 324 updates the bibliographic information with the changed print setting and issues a request to update bibliographic information to the cloud server 104.

Description of Device Management Screen of Cloud Server

Figure 6A:
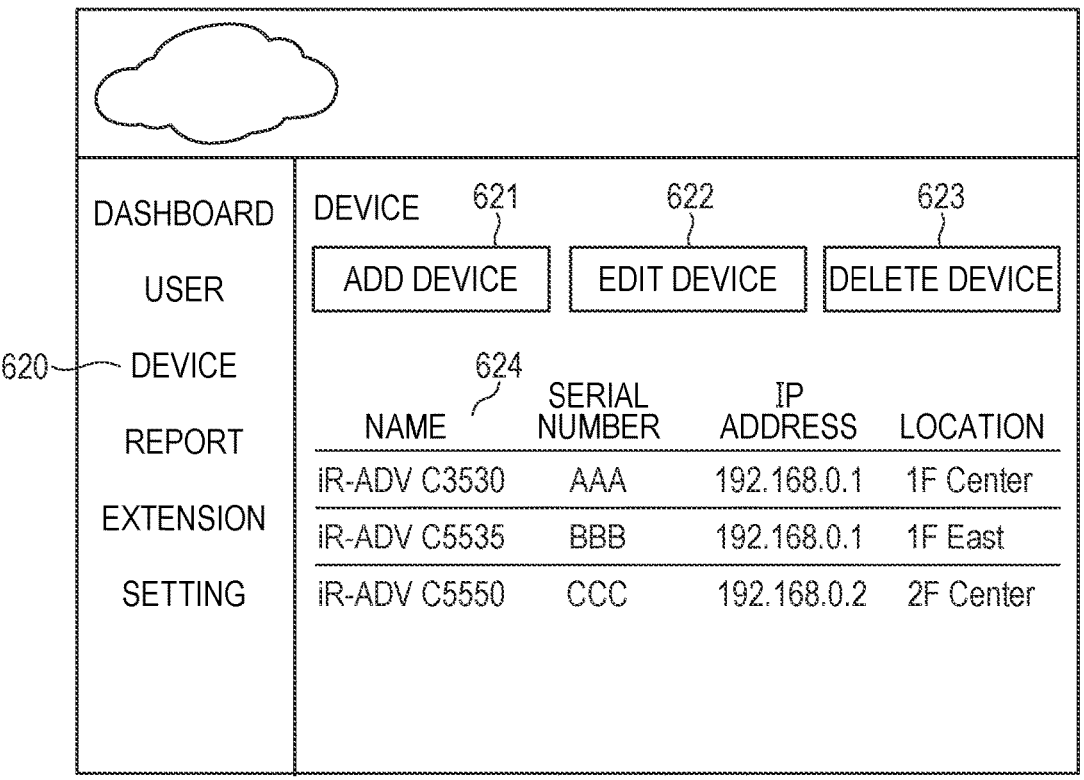
FIG. 6A and FIG. 6B are examples of screens that a setting application of the cloud server displays on a browser.
Figure 6B:
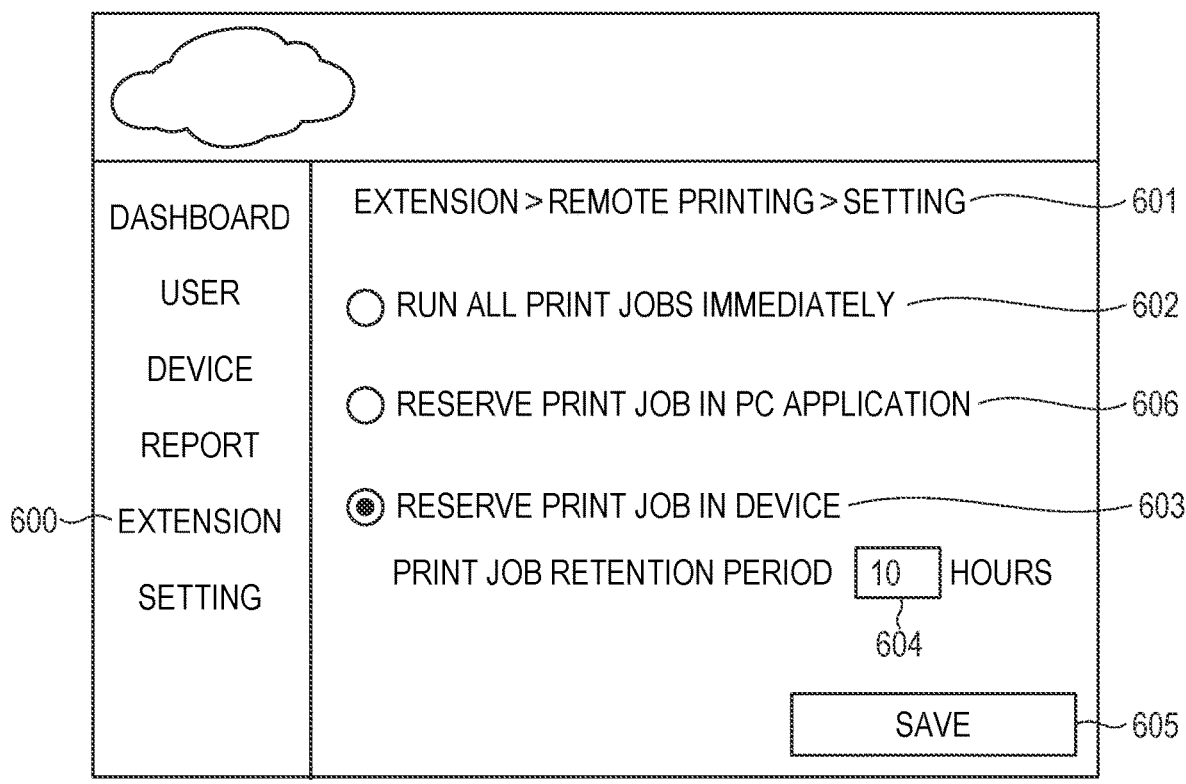

FIG. 6A and FIG. 6B are examples of various functions and setting screens that are provided by the cloud server 104 according to the embodiment. These screens are generated by the applications 407 of the cloud server 104, and the functions are provided. A web browser that operates on the information processing apparatus (personal computer) 102 communicates with the cloud server 104, and these screens are displayed on the web browser of the information processing apparatus (personal computer) 102.

FIG. 6A is a device management display screen of the device management application 411, which is displayed by clicking on a device tab 620. A list of multifunction peripherals and printers that provide the functions of the cloud server 104 is displayed in 624. Reference numeral 621 represents a device add button, reference numeral 622 represents a device edit button, and reference numeral 623 represents a device delete button. When a multifunction peripheral or printer that provides functions on the cloud server 104 is added or deleted, a user depresses the device add button 621 or the device delete button 623. When a user edits information (IP address or location) on a registered device, the user depresses the device edit button 622. The cloud server 104 provides the registered devices with functions such as authentication of allowable users, statistics and visualization of usages of print and scan at each device, and remote printing.

Description of Extension Screen of Cloud Server

FIG. 6B is an extension setting screen that is displayed by clicking on an extension tab 600. Selection and setting of remote printing, which is one of the extensions, are possible.

The setting application 412 that operates on the cloud server 104 creates a screen for the remote printing setting 601. A user selects one from among the following three as a set value to be applied.

When "EXECUTE ALL PRINT JOBS IMMEDIATELY" 602 is selected, all the devices 624 registered in the device management application 411 immediately perform printing without reserving upon receiving a print job. Therefore, this setting disables usages of remote printing.

When "RESERVE PRINT JOB IN PC APPLICATION" 606 is selected, a print application installed in advance in the information processing apparatus 102 reserves a print job in the HDD in the information processing apparatus upon receiving the print job. The print application creates bibliographic information of the reserved print job and issues a request to add the bibliographic information to the bibliography management application 413 of the cloud server 104. All the devices on the same network are set such that remote printing is available by acquiring a bibliographic information list from the bibliography management application 413 of the cloud server 104. In the case of this configuration, as listed as the problems, at the time of executing remote printing, an information processing apparatus in which a print job is reserved needs to be in operation.

When "RESERVE PRINT JOB IN DEVICE" 603 is selected, all the devices 624 registered in the device management application 411 each reserve a print job in the HDD 204 in the host machine upon receiving the print job. Each device 624 creates bibliographic information of the reserved print job and issues a request to add the bibliographic information to the bibliography management application 413 of the cloud server 104. Devices other than the devices having received print jobs each are also set such that remote printing is available by acquiring a bibliographic information list from the bibliography management application 413 of the cloud server 104.

When "RESERVE PRINT JOB IN PC APPLICATION" 606 or "RESERVE PRINT JOB IN DEVICE" 603 is selected, a print job retention period 604 can be set. This means that each of the print application on the information processing apparatus 102 or the print applications 324 on all the registered devices 624, which reserves a print job, saves the print job for a period set in the print job retention period 604 from when the print job is received. When the print job retention period 604 elapses, the print job is deleted.

When a save button 605 is clicked, set values for remote printing are saved and setting changes are applied.

Entity of Bibliographic Information

FIG. 7 is a view that shows an example of the entity of bibliographic information that the bibliography management application 413 of the cloud server 104 manages for each user.

FIG. 7 is an example of bibliographic information that the bibliography management application 413 manages, and shows bibliographic information 700 of two print jobs. Bibliographic information 700 is generated by the input machine 103 having received a print job, and is sent to and managed by the bibliography management application 413 of the cloud server 104. In other words, pieces of bibliographic information 700 on all the print jobs reserved in devices registered by the device management application 411 of the cloud server 104 are managed by the bibliography management application 413 of the cloud server 104.

Bibliographic information 700 is made up of a user name 701, a job ID 702, a date and time of receipt 703, a storage location (IP address and directory path) 704, a print setting (job name, paper size, number of copies, two-sided, staple, punch) 705. Here, the drawing shows the bibliographic information 700 of a user whose user name 701 is "Sato". Reference numeral 703 represents information indicating a date and time at which the multifunction peripheral receives the print job. Reference numeral 704 indicates the IP address of the multifunction peripheral in which the print job is stored and also indicates the path of a directory in the HDD 204 in the multifunction peripheral, in which the print job is stored. In other words, reference numeral 704 represents information for identifying the storage location of the print job. The print setting 705 is set via a printer driver from the application on the information processing apparatus (personal computer) 102. Alternatively, the print setting is changed from the print application 324 of the multifunction peripheral. Of course, a setting other than the print setting displayed here may also be held as the bibliographic information 700. Although not shown in FIG. 7, the bibliographic information 700 may include a print done flag indicating whether a print job has been already printed out.

Procedure to Set Up Remote Printing

Figure 8A:
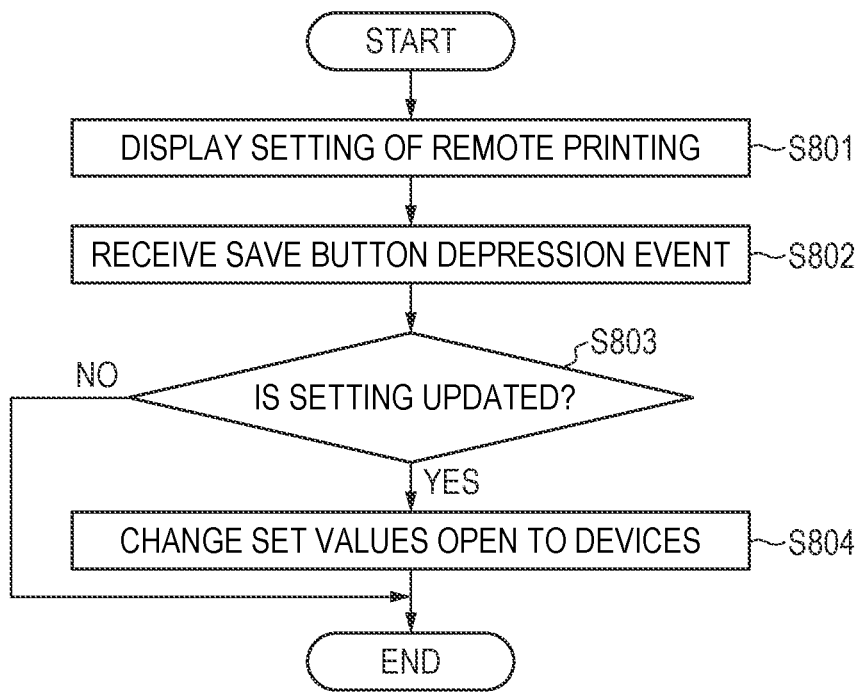
FIG. 8A and FIG. 8B are flowcharts that show examples of a procedure to set the cloud server and a procedure to set the multifunction peripheral.
Figure 8B:
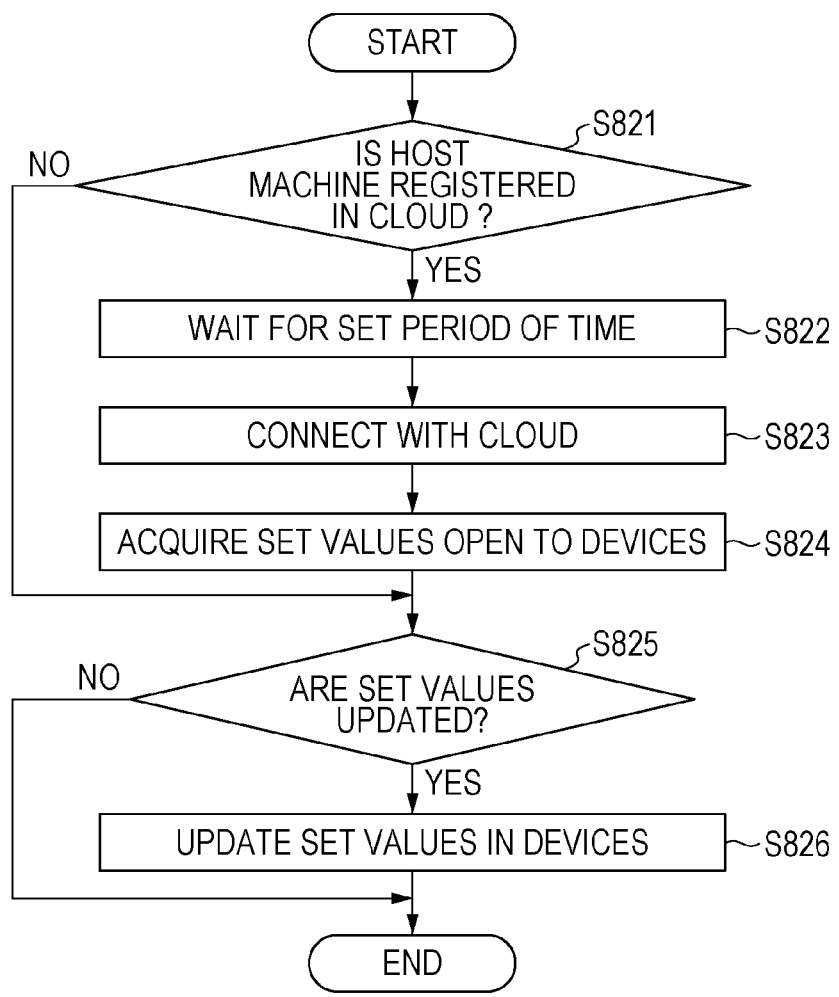

FIG. 8A is a flowchart that shows an example of a procedure to set up remote printing at the cloud server 104 according to the embodiment of the present disclosure. FIG. 8B is a flowchart that shows an example of a procedure to set up remote printing at the multifunction peripheral 103 or the multifunction peripheral 105 according to the embodiment of the present disclosure.

The setting application 412 that operates on the cloud server 104 initially in S801 displays a setting for remote printing on the web browser of the information processing apparatus (personal computer) 102.

In S802, the setting application 412 receives an event informing that the save button 605 is depressed from the web browser of the information processing apparatus (personal computer) 102.

In S803, the setting application 412 acquires set values for remote printing, set by the user from the web browser of the information processing apparatus (personal computer) 102, and determines whether the set values are updated from those when the save button 605 was depressed before. When not updated, a series of steps ends.

Whether "RESERVE PRINT JOB IN DEVICE" 603 is enabled or disabled as a set value for remote printing is checked. When the "RESERVE PRINT JOB IN DEVICE" 603 is enabled, the print job retention period 604 is also included.

When set values for remote printing are updated or at the time of an initial setting in S803, the process proceeds to S804, and the setting application 412 updates set values open to the registered devices and ends a series of steps.

The print application 324 that operates on each of the multifunction peripherals 103 and 105 initially checks in S821 whether the host machine is registered in the cloud server 104. When registered, the process proceeds to S822; whereas, when not registered, the process proceeds to S825.

In S822, the print application 324 enters a standby state for a set period of time. After the set period of time, such as an elapse of 15 minutes, the process proceeds to S823.

In S823, the print application 324 connects with the cloud server 104 via the network communication 313.

In S824, the print application 324 acquires the set values open in S804 by the setting application 412 of the cloud server 104.

In S825, the print application 324 checks whether the set values acquired from the setting application 412 of the cloud server 104 are updated as compared to the set values acquired last time. When not updated from the set values acquired last time, a series of steps ends. When updated from the set values acquired last time, the process proceeds to S826, and each of the multifunction peripherals 103 and 105 updates and applies the set values held in the HDD 204, after which a series of steps ends.

Print Job Sending Procedure

An example of a procedure in which a user sends a print job from the personal computer 102 to the multifunction peripheral 103 that is an input machine will be described. Hereinafter, it is assumed that the multifunction peripheral 103 is managed for authentication by the authentication application 321.

In the present embodiment, an example in which print set values and page description language (PDL) data are sent to the multifunction peripheral 103 as a print job will be described. PDL includes LIPS, PostScript, and the like. The multifunction peripheral 103 performs printing by interpreting PDL and performing RIP processing. A print job may be, other than PDL data, a format that the multifunction peripheral 103 is able to interpret and perform printing, for example, image data, such as TIFF, and a document format of an application.

The user launches the printer driver from an application that operates on the personal computer 102. The user performs print setting from a printer driver screen (not shown), then selects the multifunction peripheral 103, and provides a print instruction. Here, the user is able to explicitly provide an instruction for reserve printing.

When the printer driver receives a print instruction, the printer driver displays an authentication screen (not shown). The user inputs authentication information and then provides a print instruction. The printer driver sends an authentication request to the multifunction peripheral 103 together with a user name and a password. The authentication application 321 of the multifunction peripheral 103 performs authentication by communicating with the authentication application 410 on the cloud by checking the received user name and password and sends the authentication result to the personal computer 102. The printer driver receives the authentication result and ends the printing process because of an error when authentication fails.

When authentication is successful, the printer driver converts application data to PDL and generates a print job. Furthermore, the printer driver incorporates user information and designated print setting into the print job. The printer driver sends the generated print job to the multifunction peripheral 103.

When the personal computer 102 and the multifunction peripheral 103 are present in the same authentication domain and the authentication result of the personal computer 102 is guaranteed, no authentication request may be issued to the multifunction peripheral 103. Furthermore, the user information of the personal computer 102 may be used. Alternatively, an authentication process from the printer driver may be omitted, and user information registered in advance in the printer driver may be used.

Procedure to Receive Print Job

Figure 9:
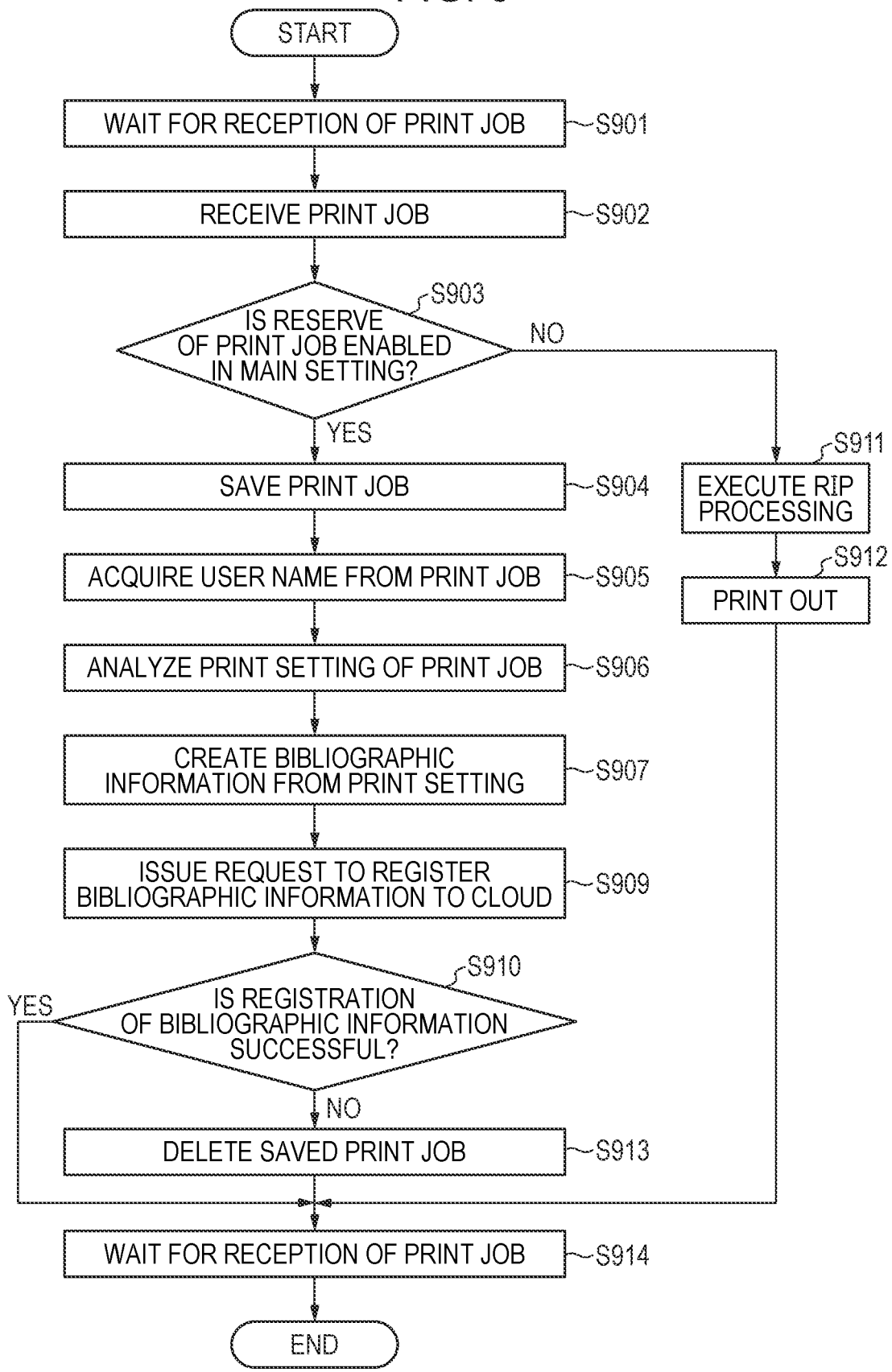
FIG. 9 is a flowchart that shows an example of a procedure in which the multifunction peripheral (input machine) inputs a print job.

FIG. 9 is a flowchart that shows an example of a procedure in which the multifunction peripheral 103 that is an input machine according to the embodiment of the present disclosure receives a print job, which is executed on the CPU 201 of the multifunction peripheral 103.

Initially, in S901, the job and device control 304 waits for reception of a print job. When the job and device control 304 receives a print job via the network I/F 210 in S902, the job and device control 304 provides notification to the print application 324.

In S903, the print application 324 checks whether the setting of "RESERVE PRINT JOB IN DEVICE" 603 is enabled in a main setting.

When "RESERVE PRINT JOB IN DEVICE" 603 is not enabled, the print application 324 issues a printing request to the job and device control 304 and proceeds to S911.

In S911, the job and device control 304 performs RIP processing on the print job in accordance with a print setting and, in S912, provides a print instruction to the printer unit 209 via the device I/F 207 to perform printing.

In S903, when "RESERVE PRINT JOB IN DEVICE" 603 is enabled, the print application 324 proceeds to S904 and saves the print job in the HDD 204 of the multifunction peripheral 103.

In S905, the print application 324 analyzes the saved print job and acquires the user name contained in the print job. In S906, the print application 324 analyzes the print setting of the saved print job.

In S907, the print application 324 creates the bibliographic information 700 from the print setting of the saved print job analyzed in S906. In S909, the print application 324 issues a request to add and register the bibliographic information 700 created in S908 to the bibliography management application 413 of the cloud server 104.

In S910, the print application 324 determines whether registration of the bibliographic information 700 to the bibliography management application 413 of the cloud server 104 is successful. When registration of the bibliographic information 700 is successful, the print application 324 proceeds to S914 and shifts into a state of waiting for reception of a print job again. When registration of the bibliographic information 700 fails, the print application 324 proceeds to S913 and deletes the print job saved in S904 from the HDD 204. After that, the print application 324 shifts into a state of waiting for reception of a print job again.

Thus, a series of the process at the time of input ends.

Procedure to Process Bibliographic Information in Bibliography Server Machine

Figure 10:
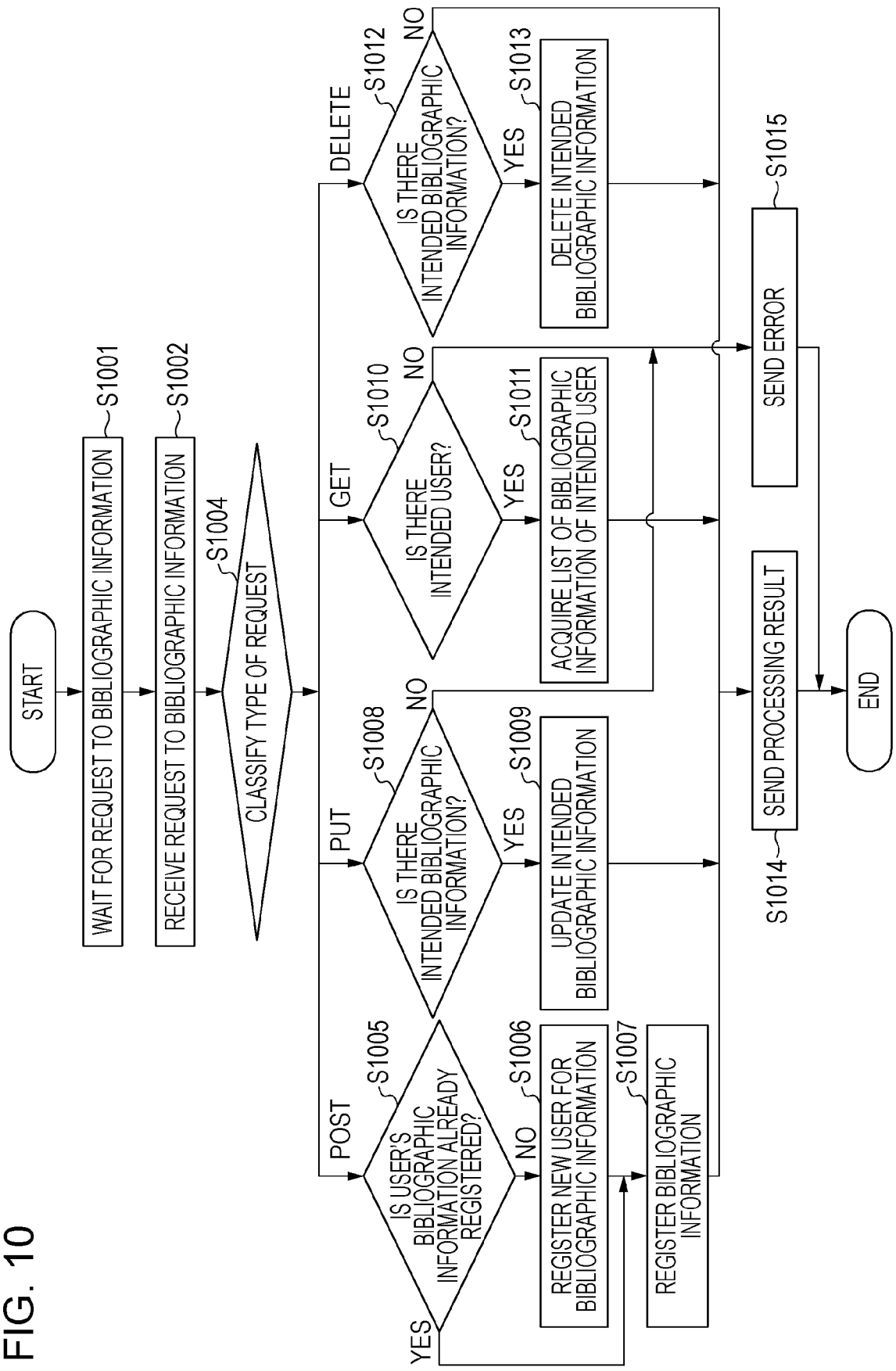
FIG. 10 is a flowchart that shows an example of a procedure in which the cloud server manages bibliographic information.

FIG. 10 is a flowchart that shows an example of a procedure to manage bibliographic information in the cloud server 104 according to the embodiment. S1001 to S1015 are steps.

Initially, in S1001, the bibliography management application 413 in the cloud server 104 waits in a state of waiting for a request on bibliographic information 700, which is issued from the print application 324 that operates on the multifunction peripheral 103 or the multifunction peripheral 105.

In S1002, the bibliography management application 413 receives a request on bibliographic information 700, which is issued from the multifunction peripheral 103 or the multifunction peripheral 105.

In S1004, the bibliography management application 413 branches a process according to the type of a request on bibliographic information 700.

In the determination of S1004, when the request is to register new bibliographic information 700, the process proceeds to S1005, and the bibliography management application 413 executes a bibliographic information registration process.

In S1005, the bibliography management application 413 determines whether the request is to register new bibliographic information 700 on an already registered user. When the request is to register new bibliographic information 700 on a non-registered user, the bibliography management application 413 creates a new user name 701 in S1006.

In S1007, the bibliography management application 413 adds intended new bibliographic information 700 to a record of the user name 701 for which bibliographic information is saved.

In the determination of S1004, when the request is to update bibliographic information 700, the process proceeds to S1008, and the bibliography management application 413 executes a process of updating the intended bibliographic information 700.

In S1008, the bibliography management application 413 determines whether there is bibliographic information 700 to be updated. When there is no bibliographic information 700 to be updated, the bibliography management application 413 sends an error message and ends a series of the process in S1015. When there is bibliographic information 700 to be updated, the bibliography management application 413 updates the intended bibliographic information 700 in S1009.

In the determination of S1004, when the request is to acquire bibliographic information 700, the process proceeds to S1010, and the bibliography management application 413 executes a process of acquiring the intended bibliographic information.

In S1010, the bibliography management application 413 determines whether there is an intended user whose bibliographic information 700 is to be acquired. When there is no intended user, the bibliography management application 413 sends an error in S1015 and ends a series of the process. When there is a user whose bibliographic information 700 is to be acquired, the bibliography management application 413 acquires a list of bibliographic information of the intended user in S1011.

In the determination of S1004, when the request is to delete bibliographic information, the process proceeds to S1012, and the bibliography management application 413 executes a process of deleting the intended bibliographic information.

In S1012, the bibliography management application 413 determines whether there is bibliographic information to be deleted. When there is no bibliographic information to be deleted, the bibliography management application 413 sends a result of deletion and ends a series of the process in S1014. When there is bibliographic information to be deleted, the bibliography management application 413 deletes the intended bibliographic information in S1013.

In S1014, the bibliography management application 413 sends a result of processing in response to a request from the print application 324 that operates on the multifunction peripheral 103 or the multifunction peripheral 105 and ends a series of the process.

Procedure to Display Print Queue

FIG. 11A is a flowchart that shows an example of a procedure in which the multifunction peripheral 105 that is an output machine according to the embodiment displays a list of print queue, which is executed on the CPU 201 of the multifunction peripheral 105. S1101 to S1151 are steps.

Initially, in S1101, the authentication application 321 displays an authentication screen (not shown) and waits for input of authentication information from a user. The operating unit 206 having received input of authentication information from the user sends the authentication information to the authentication application 321 via the operating unit I/F 205.

The authentication application 321 performs user authentication in S1102. The authentication application 321 determines in S1103 whether user authentication is successful. When the authentication application 321 determines that authentication is successful, the authentication application 321 provides the authentication result to each of the applications 309, and the process proceeds to S1104. When the authentication application 321 determines in S1103 that authentication fails, the process returns to S1101.

In S1104, the print application 324 is launched when the user depresses the print icon 501 of the print application 324 as a trigger.

In S1105, the launched print application 324 connects with the cloud server 104 via the network communication 313.

In S1106, the print application 324 issues a request to acquire bibliographic information 700 to the cloud server 104. The acquisition request contains the name of the user authenticated in S1102.

In S1107, the print application 324 determines whether acquisition of the bibliographic information 700 associated with the authenticated user from the cloud server 104 is successful. When acquisition is successful, the process proceeds to S1108, and the print application 324 displays the print queue display screen 510 on the operating unit 206 based on the acquired bibliographic information. When acquisition of bibliographic information 700 fails, the process proceeds to S1109, and the print application 324 displays an error screen on the operating unit 206.

Printing Procedure

FIG. 11B is a flowchart that shows an example of a printing procedure that is activated when a user depresses the print button 518 or the print button 559 for a selected print job at the multifunction peripheral 105 that is an output machine according to the present embodiment, which is executed on the CPU 201 of the multifunction peripheral 105. S1121 to S1132 are steps.

Initially, in S1121, the print application 324 displays the print queue display screen 510 by controlling the operating unit 206 of the multifunction peripheral 105.

In S1122, the print application 324 receives, from the application platform 307, a job list showing print jobs selected as targets to be printed by the user, from among the print jobs on the print queue display screen 510.

In S1123, the print application 324 reads, from the ROM 203, the bibliographic information of the top print job from the received job list to be printed.

In S1124, the print application 324 extracts the storage location (IP address and directory path) 704 of the print job from the bibliographic information 700.

In S1125, the print application 324 determines whether the print job is in the HDD 204 of the host device or in another device based on the extracted storage location (IP address, and the like) of the print job. When the print job is in another device, the process proceeds to S1126.

In S1126, the print application 324 issues a print job sending request to the input machine 103, in which the print job is stored, by way of the network I/F 210. The print application 324 that operates on the input machine 103 returns the print request containing print data designated by the received sending request. When reception of the print job is successful, the process proceeds to S1129. When reception of the print job fails, the print application 324 displays a printing error screen in S1128.

In S1129, the print application 324 receives the print job as a response from the input machine 103. The print application 324 executes a printing process on the received print job by way of the application platform 307.

In S1130, the print application 324 checks whether all the print jobs selected to be printed are executed.

When there is any unexecuted print job, the bibliographic information of the next print job is read in S1131, and the process in S1124 and the following steps is repeated.

In S1130, when there is no unexecuted print job, the process proceeds to S1132, and the print application 324 displays a list of print queue on the operating unit 206 again. Thus, a series of the printing process ends.

Deleting Procedure

Figure 11C:
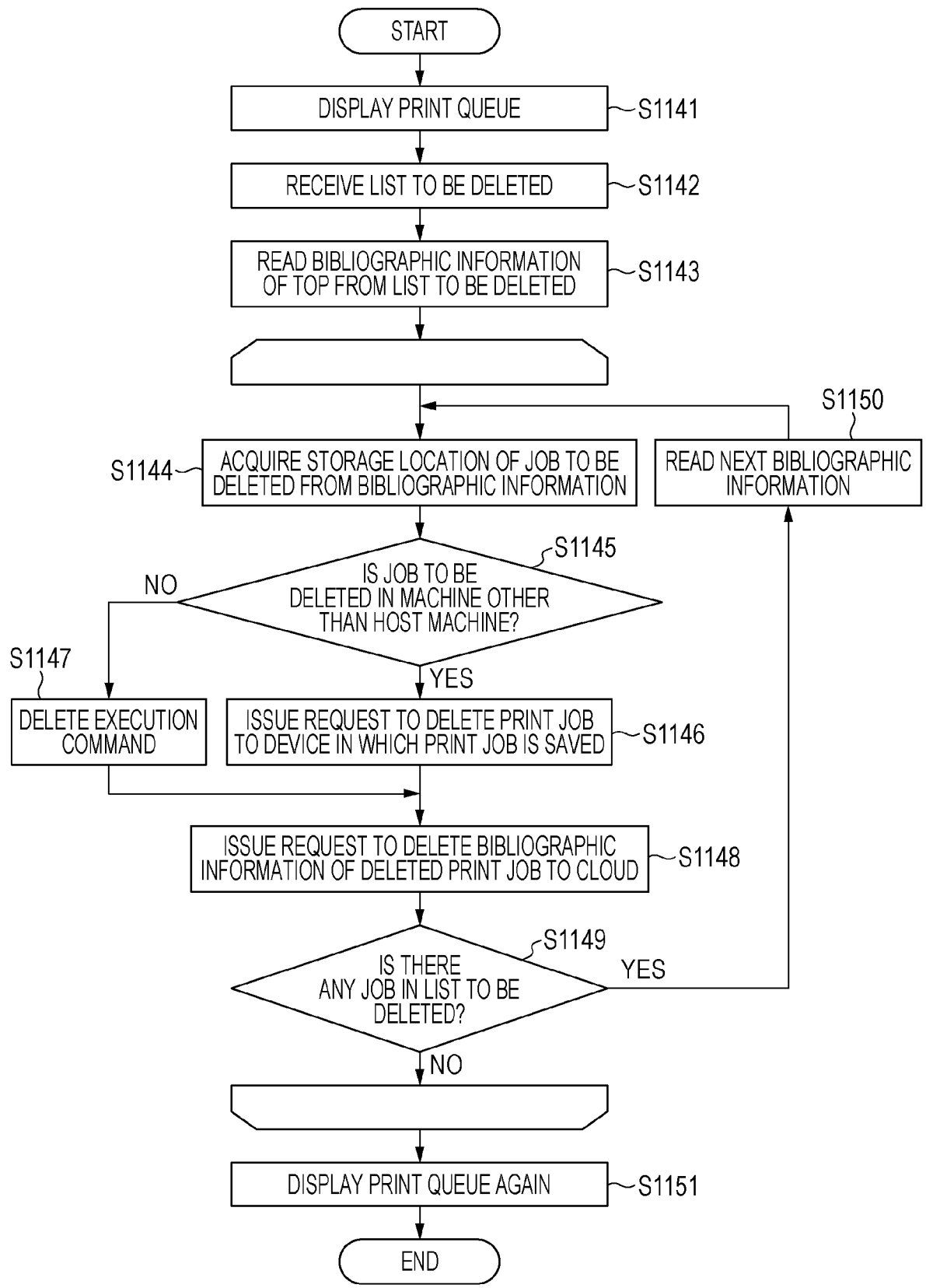
FIG. 11C is a flowchart that shows an example of a procedure in which the multifunction peripheral (output machine) deletes print data.

FIG. 11C is a flowchart that shows an example of a deleting procedure that is activated when a user depresses the delete button 519 for a selected print job at the multifunction peripheral 105 that is an output machine according to the present embodiment, which is executed on the CPU 201 of the multifunction peripheral 105. S1141 to S1151 are steps.

Initially, in S1141, the print application 324 displays the print queue display screen 510 by controlling the operating unit 206 of the multifunction peripheral 105.

In S1142, the print application 324 receives, from the application platform 307, a job list showing print jobs selected as targets to be deleted by the user, from among the print jobs on the print queue display screen 510.

In S1143, the print application 324 reads, from the ROM 203, the bibliographic information 700 of the top print job from the received job list selected to be deleted.

In S1144, the print application 324 extracts the storage location (IP address and directory path) 704 of the print job to be deleted from the bibliographic information 700.

In S1145 the print application 324 determines whether the print job to be deleted is in the HDD 204 of the host device or in another device based on the extracted storage location 704 (IP address, and the like) of the print job. When the print job is in another device, the process proceeds to S1146. When the print job is in the HDD 204 of the host device, the process proceeds to S1147, and the print job in the HDD 204 of the host device is deleted by way of the file system 303.

In S1146, the print application 324 issues a request to delete the print job to the input machine 103, in which the print job is stored, by way of the network I/F 210. The print application 324 that operates on the input machine 103 receives the delete request, deletes the print job in the HDD 204 of the input machine 103, and sends back a response.

In S1149, the print application 324 checks whether all the print jobs selected to be deleted are deleted.

When there is any undeleted print job, the bibliographic information of the print job to be deleted next is read in S1450, and the process in S1144 and the following steps is repeated.

In S1149, when there is no undeleted print job, the process proceeds to S1151, and the print application 324 displays a list of print queue on the operating unit 206 again. Thus, a series of the deleting process ends.

Procedure to Update Setting

Figure 11D:
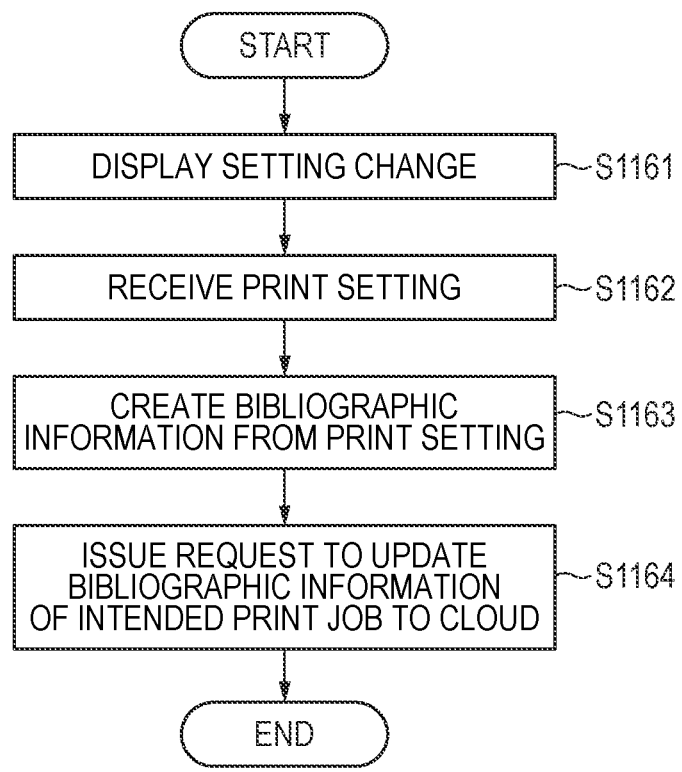
FIG. 11D is a flowchart that shows an example of a procedure in which the multifunction peripheral (output machine) changes a print setting of print data.

FIG. 11D is a flowchart that shows an example of a setting change procedure that is activated when a user selects the print setting button 520 for a selected print job at the multifunction peripheral 105 that is an output machine according to the embodiment, which is executed on the CPU 201 of the multifunction peripheral 105. S1161 to S1164 are steps.

Initially, in S1161, the print application 324 displays a setting change screen (FIG. 5C) on the operating unit 206 of the multifunction peripheral 105.

In S1162, the print application 324 receives, from the application platform 307, a print setting set by the user with the setting change screen (FIG. 5C).

In S1163, the print application 324 creates bibliographic information 700 from the received print setting.

In S1164, the print application 324 sends the created bibliographic information 700 to the cloud server 104 and issues a request to update bibliographic information. The bibliography management application 413 of the cloud server 104 having received the update request updates bibliographic information to be updated. Thus, a series of the update process ends.

As described above, in the present embodiment, while bibliographic information of print data is managed in the cloud server, print data is managed in the printing apparatus in the intranet. Thus, the printing apparatus acquires print data from the server apparatus in the normal intranet, so it is possible to shorten time from when a user provides a print instruction on an operating panel of the printing apparatus to when print data is actually printed out.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-120039, filed Jun. 27, 2019 which is hereby incorporated by reference herein in its entirety.

What is claimed is:

1. A printing system comprising:
a printing apparatus and a storage apparatus in an intranet; and
a server connected to the Internet,
the server including:
one or more first memories; and
one or more first processors that execute a set of first instructions to:
manage identification information of print data transmitted from the storage apparatus;

perform an authentication of a user based on authentication information of the user received from the printing apparatus; and transmit, to the printing apparatus, identification information of print data associated with the user after the authentication is successfully performed, the printing apparatus including:

an operation device;

one or more second memories; and one or more second processors that execute a set of second instructions to:

receive a user input of the authentication information of the user via the operation device;

control the operation device to display a list of print data associated with the user by using the identification information of print data transmitted from the server;

based on a print instruction to print out print data included in the list received from a user via the operation device, transmit, to the storage apparatus, identification information of the print data corresponding to the print instruction; and print out the print data received from the storage apparatus, and the storage apparatus including:

one or more third memories; and one or more third processors that execute a set of third instructions to:

receive print data from an external apparatus;

store the print data in the one or more third memories;

transmit identification information of the stored print data to the server;

receive the identification information of the print data from the printing apparatus; and transmit print data identified by the received identification information to the printing apparatus.

2. The printing system according to claim 1, wherein the one or more second processors further execute the set of second instructions to:

receive selection of print data to be printed from among the list of print data associated with the user; and identify the storage apparatus, in which the selected print data is stored, based on bibliographic information acquired from the server.

3. The printing system according to claim 1, wherein the one or more first processors further execute the set of the first instructions to:

receive bibliographic information including the identification information of the print data, the bibliographic information transmitted from the storage apparatus; and when a request to acquire bibliographic information is issued from the printing apparatus, send back the requested bibliographic information to the printing apparatus.

4. The printing system according to claim 1, wherein, when a deletion instruction to delete print data is received from a user via the operation device, a delete request containing identification information for identifying print data associated with the delete instruction is transmitted to the storage apparatus, and wherein a result of deletion performed in response to the delete request is sent back to the printing apparatus.

5. A control method for a printing system including a printing apparatus and a storage apparatus in an intranet and a server connected to the Internet, the server being configured to manage identification information of print data, the control method comprising:

receiving, by the storage apparatus, print data from an external apparatus;

storing, by the storage apparatus, the print data in one or more memories of the storage apparatus;

transmitting, by the storage apparatus, identification information of the stored print data to the server;

managing, by the server, identification information of print data transmitted from the storage apparatus;

receiving, by the printing apparatus, a user input of the authentication information of the user via the operation device of the printing apparatus;

performing, by the server, an authentication of a user based on authentication information of the user received from the printing apparatus;

transmitting, by the server, identification information of print data associated with the user to the printing apparatus, in a case where the authentication is successfully performed;

controlling, by the printing apparatus, the operation device to display a list of print data associated with the user by using the identification information of print data transmitted from the server;

based on a print instruction to print out print data included in the list received from a user via the operation device, transmitting, by the printing apparatus, identification information of the print data corresponding to the print instruction, to the storage apparatus;

receiving, by the storage apparatus, the identification information of the print data from the printing apparatus;

transmitting, by the storage apparatus, print data identified by the received identification information to the printing apparatus; and printing out, by the printing apparatus, the print data received from the storage apparatus.

* * * * *